United States Patent [19]

Yoshida et al.

[11] Patent Number: 5,257,131
[45] Date of Patent: Oct. 26, 1993

[54] POLARIZATION DIFFRACTION ELEMENT AND POLARIZATION DETECTOR EMPLOYING THE SAME

[75] Inventors: Yoshio Yoshida; Takahiro Miyake, both of Tenri; Yasuo Nakata, Kashihara; Yukio Kurata, Tenri, all of Japan

[73] Assignee: Sharp Kabushiki Kaisha, Osaka, Japan

[21] Appl. No.: 713,840

[22] Filed: Jun. 12, 1991

[30] Foreign Application Priority Data

Jun. 13, 1990 [JP] Japan ................. 2-158076
Aug. 27, 1990 [JP] Japan ................. 2-226320

[51] Int. Cl.$^5$ ............... G02B 5/18; G02B 5/30; G11B 7/12
[52] U.S. Cl. ................... 359/485; 359/558; 359/569; 369/109; 369/110; 250/237 G
[58] Field of Search .......... 369/44.14, 109, 110; 365/121, 124, 127; 359/15, 24, 483, 501, 558, 566, 569, 571, 486, 485; 250/237 G

[56] References Cited

U.S. PATENT DOCUMENTS

| | | | |
|---|---|---|---|
| 4,800,547 | 1/1989 | Kessels et al. | 369/109 X |
| 4,993,789 | 2/1991 | Biles et al. | 359/15 |
| 5,029,154 | 7/1991 | Sumi et al. | 359/569 X |
| 5,085,496 | 2/1992 | Yoshida et al. | 359/569 |

FOREIGN PATENT DOCUMENTS

| | | | |
|---|---|---|---|
| 59084 | 9/1982 | European Pat. Off. | |
| 322714 | 7/1989 | | |
| 349309 | 1/1990 | European Pat. Off. | |
| 0178154 | 7/1989 | Japan | 369/109 |
| 2-259702 | 10/1990 | Japan | |
| 0265037 | 10/1990 | Japan | 369/109 |
| 2267747 | 11/1990 | Japan | 369/109 |
| 0037834 | 2/1991 | Japan | 369/109 |
| 3-137841 | 6/1991 | Japan | |

OTHER PUBLICATIONS

Yokomori, K. "Dielectric surface-relief gratings with high diffraction efficiency" Jul. 15, 1984/ vol. 23, No. 14/ *Applied Optics* pp. 2302–2310.

Maeda, H. et al. "A High Density Dual Type Grating for Magneto-Optical Disc Head" *Japanese Journal of Applied Physics*, vol. 28 (1989) Supplement 28-3, pp. 193–195.

Primary Examiner—Bruce Y. Arnold
Assistant Examiner—David R. Parsons
Attorney, Agent, or Firm—Birch, Stewart, Kolasch & Birch

[57] ABSTRACT

A polarization diffraction element comprising two diffraction gratings formed on both faces of a substrate respectively. Both the diffraction gratings have grating lines which are arranged at the same grating pitch, and whose directions mutually form a predetermined minute angle. The grating lines may also be arranged parallel to each other. In this case, the relationship between grating pitches $D_1$, $D_2$ of the respective diffraction gratings and the wavelength $\lambda$ of an incident light is expressed as:

$$0 < |\lambda(1/D_1 - 1/D_2)(1-(\lambda/2D_1)^2)^{-(\frac{1}{2})}| \leq 0.35; \text{ or}$$

$$0 < |\lambda(1/D_1 - 1/D_2)(1-(\lambda/D_1 - \lambda/2D_2)^2)^{-(\frac{1}{2})}| \leq 0.35$$

In a polarization detector employing this polarization diffraction element, a single converging lens of a small effective diameter separates one polarization from another polarization and converges them separately on different photodetectors. Consequently, a still more compact and lightweight optical pickup can be manufactured.

7 Claims, 12 Drawing Sheets

POLARIZATION DIFFRACTION ELEMENT AND POLARIZATION DETECTOR EMPLOYING THE SAME

FIELD OF THE INVENTION

The present invention relates to a polarization detector having a polarization diffraction element used for optical pickups and the like. More particularly, the present invention relates to a polarization diffraction element for separating an incident light into two light beams of different polarization, and a polarization detector employing the same.

BACKGROUND OF THE INVENTION

A diffraction grating whose grating pitch is formed nearly equal to a predesignated wavelength of the light is known to have a particular polarization characteristic (see K. Yokomori, "Dielectric surface-relief gratings with high diffraction efficiency", Applied Optics Vol.23, No.14, pp2303, 1984).

As shown in FIG. 10, a polarization diffraction element 61 comprises a diffraction grating 63 (shown by hatching for convenience, sake) formed on one face of a transparent substrate 62 which is made of glass or other material. The diffraction grating 63 has a polarization characteristic and its pitch is formed nearly equal to the wavelength of an incident light. The diffraction grating is fabricated by the two beam interference method or other method.

More concretely, for example the diffraction grating 63 is made of photoresist, and its thickness and grating pitch are respectively set at 1 $\mu$m and 0.5 $\mu$m. The diffraction grating 63 is fabricated such that a P-polarization of an incident light 64 is transmitted at virtually 100% and an S-polarization thereof is diffracted at virtually 100%.

If the incident light 64 with a wavelength of for example 0.8 $\mu$m falls upon the polarization diffraction element 61 at the Bragg angle, the P-polarization of the incident light 64 is transmitted as a zeroth-order diffracted light beam 64a through the diffraction grating 63, but it can hardly be diffracted as a first-order diffracted light beam 64b.

On the contrary, the S-polarization of the incident light 64 is diffracted as a first-order diffracted light beam 64b by the diffraction grating 63, but it can hardly be transmitted as a zeroth-order diffracted light beam 64a.

In a polarization detector having the polarization diffraction element 61, the detection of the polarization of the zeroth-order diffracted light beam 64a and the first-order diffracted light beam 64b thus separated is made by converging the diffracted light beams on photodetectors 67, 68 through converging lenses 65, 66 respectively.

As described above, since the diffraction grating 63 has the characteristic of separating one polarization from another polarization, it can substitute for conventional polarization beam splitters used in optical pickups for magneto-optical recording and reproducing devices. Accordingly, a still more compact and lightweight optical pickup can be manufactured.

However, in the conventional polarization diffraction element 61, the diffraction angle of the diffracted light beam from the diffraction grating 63 depends on the wavelength of the incident light 64. Therefore, for example in the case of using a laser diode as light source, if the wavelength of light emitted from the laser diode varies due to changes in ambient temperature or other factor, the diffraction angle will also change in accordance with the above variation.

For instance, when the wavelength of the incident light 64 equals a predetermined wavelength, the first diffracted light beam 64b is diffracted at a predetermined diffraction angle and converged on the photodetector 68 by the converging lens 66. At this time, if ambient temperature of the laser diode lowers and the wavelength of the incident light 64 becomes shorter than the predetermined wavelength, the diffraction angle also becomes smaller proportionally. Therefore, the first diffracted light beam 64b diffracted by the diffraction grating 63 deviates from a predetermined optical path as shown by the alternate long and two short dashes line of the figure. Consequently, the first diffracted light beam 64b can not be converged on a specified point on the photodetector 68, which causes the detection of the S-polarization to be infeasible.

As described above, in the polarization diffraction element 61, the grating pitch of the diffraction grating 63 is set so as to be nearly equal to the wavelength. As a result, a small variation in the wavelength of the incident light 64 causes the diffraction angle to change greatly and causes the optical path of the first diffracted light beam 64b to deviate.

To counteract this, there is an idea of increasing the size of the reception section of the photodetector 68 to receive the deviated first-order diffracted light beam 64b. This idea, however, presents a disadvantageous factor when aiming at manufacturing a compact and lightweight optical pickup, as the optical pickup gets large when the polarization diffraction element 61 incorporated therein together with the photodetector 68. In addition, even when the photodetector is made larger to receive the first diffracted light beam 64b independently of the deviation of the optical path, the first diffracted light beam 64b can not be converged on a regular point in the photodetector 68 due to the variation in the wavelength of the incident light 64, thereby lowering the accuracy of the detection of the S-polarization.

Moreover, as the diffraction angle of the first-order diffracted light beam 64b is large, i.e. around 100°, the first-order diffracted light beam 64b and the zeroth-order diffracted light beam 64a travel wide apart from each other. Therefore, the photodetectors 67, 68 need to be placed at a great distance, which causes disadvantages in miniaturizing the optical pickup and decreasing its weight.

Suppose diffraction efficiency $\eta_{0P}$ represents the diffraction efficiency when the P-polarization is transmitted to produce the zeroth-order diffracted light beam 64a of the incident light 64, and diffraction efficiency $\eta_{1S}$ represents the diffraction efficiency when the S-polarization is diffracted to produce the first-order diffracted light beam thereof. As aforesaid, the diffraction grating 63 is fabricated such that the P-polarization is transmitted at virtually 100% and the S-polarization is diffracted at virtually 100%. In reality, however, if the incident light 64 only falls upon the single diffraction grating 63, both of the diffraction efficiency $\eta_{0P}$ and the diffraction efficiency $\eta_{1S}$ are about 0.99. In another word, the zeroth-order diffracted light beam 64a transmitted through the diffraction grating 63 contains a small amount of S-polarization that is transmitted through the diffraction grating 63 with diffraction efficiency $\eta_{0S}$ of about 0.01. Similarly, the first-order diffracted light beam 64b diffracted from the diffraction grating 63 contains a small amount of P-polarization that was diffracted by the diffraction grating 63 with diffraction efficiency $\eta_{1P}$ of about 0.01.

Thus, in case of splitting the incident light 64 by means of the single diffraction grating 63, the ratio of the diffraction efficiency $\eta_{0S}$ to the diffraction efficiency $\eta_{0P}$ shows the proportion of other polarization contained in desired polarization, i.e. the degree of polarization, for the zeroth-order diffracted light beam 64a. Similarly, the ratio of the diffraction efficiency $\eta_{1P}$ to the diffraction efficiency $\eta_{1S}$ shows the degree of polarization for the first-order diffracted light beam 64b.

Accordingly, when determining the degree of polarization of the zeroth-order diffracted light beam and of the first-order diffracted light beam, both are found to be about 0.01. The degree of separation of the P-polarization and the S-polarization is not of a level sufficient for practical use.

Therefore, the present inventors have invented a polarization detector having a polarization diffraction element whose structure is shown in FIG. 11 to FIG. 13. (Japanese Publication for Unexamined Patent Application No. 2-259702/1990)

More precisely, as shown in FIG. 11, a polarization diffraction element 41 comprises a flat-shaped transparent substrate 42 made of glass or other material, and diffraction gratings 43 and 44 formed on both faces of the substrate 42 respectively (shown by hatching for convenience' sake). The diffraction gratings 43 and 44 have the same grating pitch. The grating pitch is nearly equal to the wavelength of an incident light 45 and the grating lines are perpendicular to the drawing surface. The diffraction gratings 43 and 44 are of the relief type which are for example etched on the substrate 42.

As shown in FIG. 12, in the diffraction gratings 43 and 44, there are sinusoidal waveform bumps 46 formed at intervals of a grating pitch D. The diffraction gratings 43 and 44 are fabricated such that a P-polarization contained in the incident light 45, whose electric field oscillates in a direction parallel with the drawing surface of FIG. 11, is transmitted at virtually 100% and an S-polarization contained in the incident light 45, whose electric field oscillates in a direction orthogonal to the drawing surface of FIG. 11, is diffracted at virtually 100%. Therefore, when the wavelength of the incident light 45 of FIG. 11 equals 0.8 μm and the refractive index of the substrate 42 equals 1.5, the grating pitch D is set to about 0.5 μm and the groove depth t of the grating to about 1 μm.

In the above arrangement, when the incident light 45 falls upon the polarization diffraction element 41 at an incident angle $\theta_{i1}$, the P-polarization is transmitted through the diffraction gratings 43 and 44 to produce a zeroth-order diffracted light beam 45a, and emerges from the polarization diffraction element 41. On the other hand, the S-polarization contained in the incident light 45 is diffracted by the diffraction grating 43 at a diffraction angle $\delta_1$ to produce a first-order diffracted light beam 45b, diffracted further by the diffraction grating 44 at a diffraction angle $\delta_2$, and emerges from the polarization diffraction element 41.

The diffraction angles $\delta_1$ and $\delta_2$ are determined in accordance with the grating pitch D of the diffraction gratings 43 and 44, and the wavelength of the incident light 45. Consequently, when the diffraction gratings 43 and 44 are formed to have the same grating pitch D, the diffraction angles $\delta_1$ and $\delta_2$ are also equal. The zeroth-order diffracted light beam 45a and the first-order diffracted light beam 45b thus emerge from the polarization diffraction element 41 in parallel. By setting the incident angle $\theta_{i1}$ of the incident light 45 such that it satisfies the equation:

$$\theta_{i1} = \sin^{-1}(\lambda/2D)$$

where $\lambda$ is the wavelength of the incident light 45, i.e. by setting the incident angle $\theta_{i1}$ of the incident light 45 at the so-called Bragg angle, the aforementioned incident angle $\theta_{i1}$ and an incident angle $\theta_{i2}$ can be made equal. The incident angle $\theta_{i2}$ is the angle whereat the first-order diffracted light beam 45 diffracted by the diffraction grating 43 falls upon the diffraction grating 44. Thus, the characteristics of the diffraction gratings 43 and 44 may be easily rendered uniform.

The following will explain the detection of the zeroth-order diffracted light beam 45a and the first-order diffracted light beam 45b separated in the manner described above.

As illustrated in FIG. 13, on the optical path of the zeroth-order diffracted light beam 45a, a converging lens 47 is placed at a predetermined distance from the polarization diffraction element 41, and a photodetector 48 is displaced on a prescribed converging point. Similarly, on the optical path of the first-order diffracted light beam 45b, a converging lens 49 is placed at a predetermined distance from the polarization diffraction element 41, and a photodetector 50 is disposed on a specified converging point. The photodetectors 48 and 50 are respectively installed in packages 51 and 52.

With such an arrangement, when the wavelength of the incident light 45 becomes shorter than the given wavelength, both diffraction angles $\delta_1$ and $\delta_2$ consequently become smaller diffraction angles $\delta'_1$ and $\delta'_2$. As a result, the first-order diffracted light beam 45b diffracted by the diffraction grating 43, deviates from the predetermined optical path and travels as shown by the alternate long and two short dashes line in the figure, and therefore the first-order diffracted light beam 45b falls upon a different point on the diffraction grating 44.

However, as the substrate 42 is very thin, the deviation of the first-order diffracted light beam 45b from the predetermined optical path is a slight one, and the first-order diffracted light beam 45b emerges from a slightly shifted position. In addition, as described above, since the diffraction gratings 43 and 44 have the same grating pitch D, the diffraction angles $\theta'_1$ and $\theta'_2$ are also equal. As a result, the first-order diffracted light beam 45b emerges from the polarization diffraction element 41 in parallel with the zeroth-order diffracted light beam 45a. Accordingly, even when the wavelength of the incident light 45 becomes shorter, the emerging position of the first-order diffracted light beam 45b from the polarization diffraction element 41 only shifts slightly, and the first-order diffracted light beam 45b can thus be converged on the specified point on the photodetector 50 by the converging lens 49.

The following will explain the degree of polarization obtained with the diffraction gratings 43 and 44.

As shown in FIG. 11, in practice, the zeroth-order diffracted light beam 45a transmitted through the diffraction grating 43 contains a small amount of the S- polarization transmitted with diffraction efficiency $\eta_{0S}$ in addition to the P-polarization transmitted with diffraction efficiency $\eta_{0P}$. Suppose the diffraction efficiency $\eta_{0P}$ and $\eta_{0S}$ are 0.99 and 0.01 respectively, the degree of polarization at this time is about 0.01.

When the zeroth-order diffracted light beam 45a falls upon the diffraction grating 44 which has the same diffraction efficiency $\eta_{0P}$, $\eta_{0S}$ as the diffraction grating 43, the diffraction efficiency $\eta_{0P}$ and $\eta_{0S}$ are respectively raised to the second power. As a result, the P-polarization is transmitted with diffraction efficiency $\eta_{0P}^2$ and the S-polarization is transmitted with diffraction efficiency $\eta_{0S}^2$. Hence, when the degree of polarization of the zeroth-order diffracted light beam 45a is determined in the same manner as described above, the degree of polarization equals substantially 0.0001, that is 1/100 of the value obtained when the zeroth-order diffracted light beam 45a is transmitted only through the diffraction grating 43.

Meanwhile, the incident light 45 is diffracted by the diffraction grating 43 to produce the first-order diffracted light beam 45b with diffraction efficiency $\eta_{1P}$ for the P-polarization and diffraction efficiency $\eta_{1S}$ for the S-polarization. The first-order diffracted light beam 45b then falls upon the diffraction grating 44 where the P-polarization is diffracted with diffraction efficiency $\eta_{1P}^2$ and the S-polarization is diffracted with diffraction efficiency $\eta_{1S}^2$. Accordingly, suppose the diffraction efficiency $\eta_{1P}$ and $\eta_{1S}$ are respectively equal to 0.01 and 0.99, the degree of polarization of the first-order diffracted light beam 45b is about 0.01 in the diffraction grating 43, and about 0.0001 in the diffraction grating 44. This means that the amount of the S-polarization contained in the zeroth-order diffracted light beam 45a is so small that it can be considered as almost non-existent. The same can be said about the P-polarization contained in the first-order diffracted light beam 45b.

Accordingly, as described above, by having the incident light 45 pass through the diffraction gratings 43 and 44, the degree of separation of the P-polarization and S-polarization contained in the incident light 45 may be enhanced to a level high enough to be put into practice.

FIG. 14 shows a polarization detector which is modified from the polarization detector shown in FIG. 11 to FIG. 13. The members having the same functions as the aforementioned device will be designated by the same numerals and their description will be omitted.

As shown in FIG. 14, a converging lens 53 for converging the zeroth-order diffracted light beam 45a as well as the first-order diffracted light beam 45b, is disposed on the optical paths of the respective diffracted light beams. Photodetectors 48 and 50 are installed in a single package 54. The photodetectors 48 and 50 respectively receive the zeroth-order diffracted light beam 45a and the first-order diffracted light beam 45b at the specified converging points with respect to the converging lens 53.

With such an arrangement, the zeroth-order diffracted light beam 45a and the first-order diffracted light beam 45b are respectively converged by the single converging lens 53 on points located in the middle of the optical paths of the respective polarizations. The photodetectors 48 and 50 may be disposed in a row on a substrate section inside the package 54, or may be formed in a row on a single semiconductor substrate made of Si or other material, and therefore they may be installed in adjacent positions.

However, in the polarization detector as shown in FIG. 11 to FIG. 13, two converging lenses 47 and 49 are needed for the respective zeroth-order diffracted light beam 45a and the first-order diffracted light beam 45b. On the contrary, in the polarization detector as shown in FIG. 14, since the zeroth-order diffracted light beam 45a and the first-order diffracted light beam 45b which mutually travel in parallel need to be converged on adjacent converging points by the single converging lens 53, it is necessary to keep the zeroth-order diffracted light beam 45a and the first-order diffracted light beam 45b separate from each other to prevent overlapping when they fall upon the converging lens 53. Consequently, the converging lens 53 needs to have an effective diameter which is at least twice larger than the diameter of the incident light 45.

As described above, the polarization detector as shown in FIG. 11 to FIG. 13, and FIG. 14, is developed without sufficiently aiming at manufacturing a compact and lightweight converging optical system.

SUMMARY OF THE INVENTION

An object of the present invention is to provide a polarization detector which is capable of converging two polarized light beams on photodetectors respectively by using a single converging lens of a small effective diameter.

Another object of the present invention is to provide a polarization detector which enables the miniaturization of an optical pickup and a decrease in its weight.

In order to achieve the above-mentioned objects, a polarization detector according to the present invention comprises a polarization diffraction element. The polarization diffraction element is composed of a flat-shaped transparent substrate having a plurality of faces, a first diffraction grating formed on one of the plurality faces of the substrate, and a second diffraction grating formed on another face thereof. Both the first diffraction grating and the second diffraction grating have grating lines which are arranged at approximately equal grating pitches, and directions of the grating lines mutually form a predetermined acute angle. The polarization detector further comprises a converging lens and a pair of photodetectors. A light beam transmitted through the first and second diffraction gratings and a light beam diffracted by these diffraction gratings are incident on the converging lens, and then received by the photodetectors respectively.

In this arrangement, when an incident light with a predetermined wavelength falls upon the polarization diffraction element, a light beam is transmitted through the first and second diffraction gratings and a light beam is diffracted by these diffraction gratings such that they emerge from the polarization diffraction element through a separation angle proportional to the angle between the grating lines of the first diffraction grating and that of the second diffraction grating. More precisely, a P-polarization and an S-polarization respectively emerge from the polarization diffraction element at slightly different angles. Thus, a zeroth-order diffracted light beam and a first-order diffracted light beam can be converged on different points by means of a single converging lens with a comparatively small effective diameter. Besides, the grating pitch of the first diffraction grating and that of the second diffraction grating are equal, converging point shift of the diffracted light beams due to change in wavelength of the incident light can scarcely occur. Moreover, if the deviation of the incident angle $\theta$ from the Bragg angle is set within an allowable range, the obtainable optical characteristics of the polarization will not be deteriorated.

In order to achieve above objects, another polarization detector according to the present invention comprises a polarization diffraction element. The polarization diffraction element is composed of a flat-shaped transparent substrate having a plurality of faces, a first diffraction grating formed on one of the plurality faces of the substrate, and a second diffraction grating formed on another face thereof. Both a grating pitch of the first diffraction grating and a grating pitch of the second diffraction grating are approximately equal to the wavelength of an incident light. Besides, grating lines of the first diffraction grating and that of the second diffraction grating are set in the same direction. A grating pitch $D_1$ of the first diffraction grating and a grating pitch $D_2$ of the second diffraction grating are arranged to satisfy the condition:

$$0 < |\lambda(1/D_1 - 1/D_2)(1 - (\lambda/2D_1)^2) - (1)| \leq 0.35; \text{ or}$$

$$0 < |\lambda(1/D_1 - 1/D_2)(1 - (\lambda/D_1 - \lambda/2D_2)^2) - (1)| \leq 0.35$$

The polarization detector further comprises a converging lens and a pair of photodetectors. A light beam transmitted through the first and second diffraction gratings and a light beam diffracted by these diffraction gratings are incident on the converging lens, and are then received by the photodetectors respectively.

In this arrangement, the grating pitches $D_1$ and $D_2$ of the first and second diffraction gratings are set to satisfy the above equation. Accordingly, when an incident light with a prescribed wavelength falls upon the polarization diffraction element, a light beam is transmitted through the first and second diffraction gratings and a light beam is diffracted by these diffraction gratings so that they emerges from the polarization diffraction element through a separation angle, defined as the angle between the transmitted and diffracted light beams, of smaller than 20° (0.35rad) and then fall upon the converging lens. Accordingly, even if the two light beams overlap when falling upon the converging lens, they can be converged on different points in the focal surface. Consequently, the two light beams can easily be separated from each other by means of a single converging lens of a comparatively small effective diameter, and converged on respective photodetectors for receiving the light beams.

In the mean time, as the difference between the grating pitch of the first diffraction grating and that of the second diffraction grating is very small, the effect of restraining converging point shift on the photodetectors due to changes in wavelength of the incident light can hardly be lowered.

The first diffraction grating is preferably positioned such that the incident light falls thereon at an incident angle $\theta$, where the incident angle $\theta$ is defined as:

$$\sin^{-1}(\lambda/2D_1) \leq \theta \leq \sin^{-1}(\lambda/D_1 - \lambda/2D_2); \text{ or}$$

$$\sin^{-1}(\lambda/D_1 - \lambda/2D_2) \leq \theta \leq \sin^{-1}(\lambda/2D_1)$$

When the incident angle $\theta$ is set to satisfy the above equation, the deviation of the incident angle $\theta$ from the Bragg angle is very small, and therefore the optical characteristics of the polarization diffraction element can hardly be lowered.

Thus, integrating the above-mentioned polarization detector into optical pickup results in a still more compact and lightweight optical pickup.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a view schematically illustrating the structure of a polarization detector.

FIG. 2 is a plan view illustrating the polarization detector of FIG. 1 from $-y$ direction.

FIG. 3 is a perspective view illustrating a polarization diffraction element.

FIG. 4 is a graph showing the relationship between the diffraction efficiency and the direction of grating lines of diffraction gratings formed on the polarization diffraction element.

FIG. 5 is a view schematically illustrating the structure of a polarization detector.

FIG. 6 is a schematic explanatory view illustrating the polarization diffraction element.

FIG. 7 is an explanatory view illustrating the conditions to be satisfied by grating pitches.

FIG. 8 is a view schematically illustrating an optical pickup.

FIG. 9 is a graph showing the relationship between incident angle and diffraction efficiency.

FIG. 11 is a schematic explanatory view illustrating a polarization diffraction element.

FIG. 12 is a schematic cross section showing a diffraction grating.

FIG. 13 is a view schematically illustrating the polarization detector.

DETAILED DESCRIPTION OF THE PREFERRED EMBODIMENTS

Referring to FIG. 1 to FIG. 4, the following will explain one embodiment of the present invention.

Figure 1:
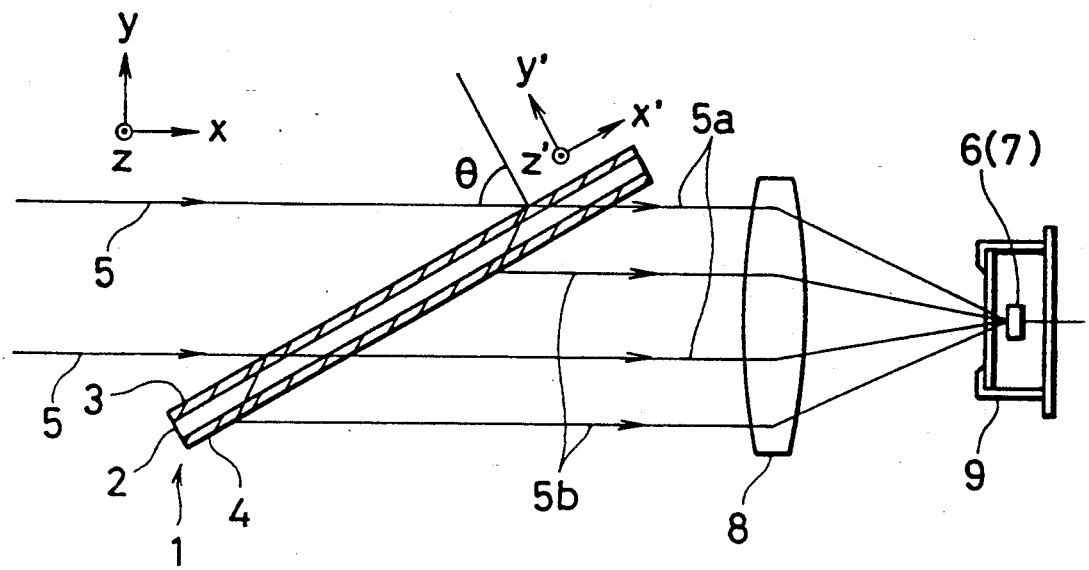
FIG. 1 to FIG. 4 show one embodiment of the present invention.

As shown in FIG. 1, axes of coordinate (X, Y, Z) are arranged so that the X axis parallels with the optical axis of an incident light 5. Axes of coordinate (X', Y', Z') are also set so that a Z'- X' plane parallels with the face of a polarization diffraction element 1.

Figure 3:
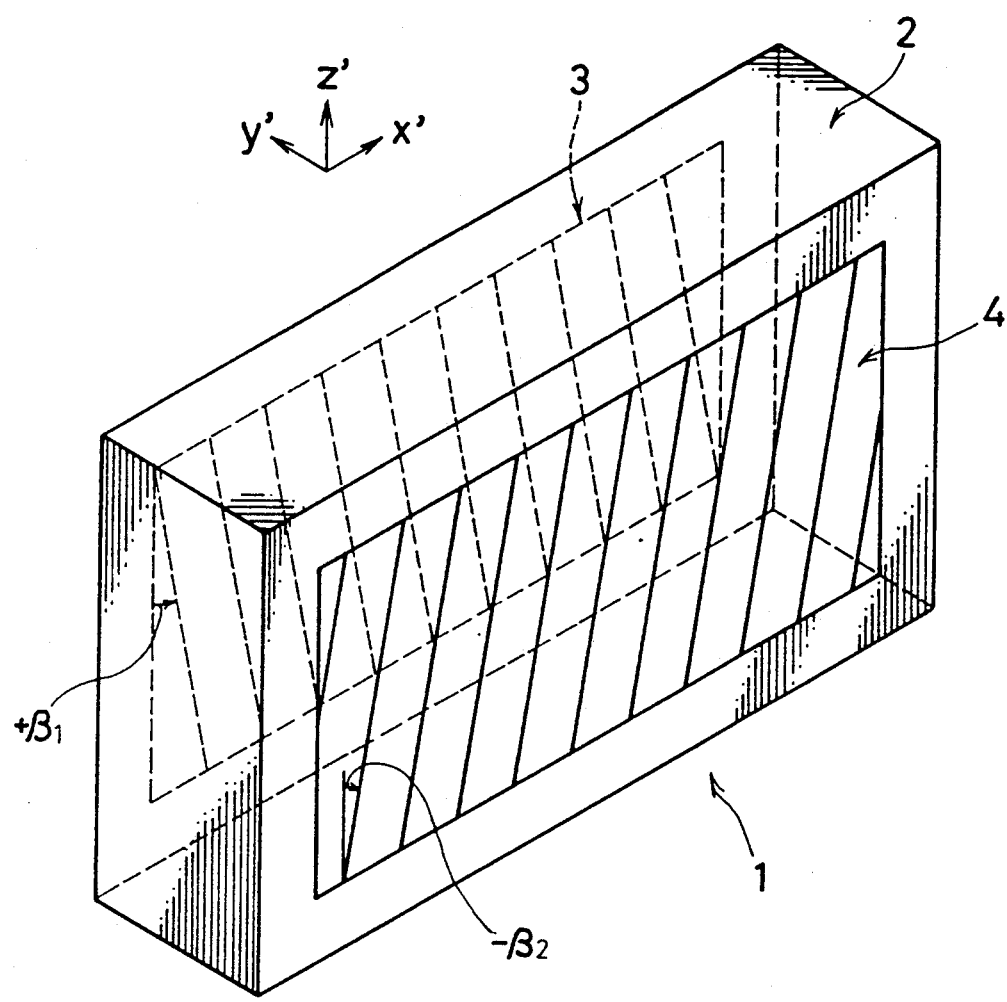

As shown in FIG. 3, the polarization diffraction element 1 of the present invention comprises a transparent substrate 2, a first diffraction grating 3 formed on one face of the substrate 2, and a second diffraction grating 4 formed on the other face of the substrate 2. The first and second diffraction gratings 3 and 4 are formed with the same grating pitch D, and directions of their grating lines form a predetermined acute angle $(\beta_1 + \beta_2)$. The polarization diffraction element 1 is placed obliquely to the light source (not shown) so that the incident light 5 falls upon the diffraction grating 3 at an incident angle $\theta$ which will be described later. A converging lens 8 and photodetectors 6, 7 stored in a package 9, are placed in this order in the direction of the X axis.

The transparent substrate 2 is made of glass, plastic or other material. The diffraction gratings 3 and 4 are of the relief type which are, for example, etched on the substrate 2. The diffraction gratings 3 and 4 may be formed by, for example, photoresist instead of etching. The profiles of the diffraction gratings 3 and 4 are the same as the one shown in FIG. 12, and they mutually have the same grating pitch D as aforesaid. As shown in FIG. 3, the grating lines of the diffraction grating 3 are formed in a direction crossing the Z' axis at an angle of $+\beta_1$ in the Z'- X' plane. On the contrary, the diffraction grating 4 is formed in a direction crossing the Z' axis at an angle of $-\beta_2$ in the Z'- X' plane. Thus, the grating lines of the diffraction grating 3 and that of the diffraction grating 4 form an angle of $(\beta_1+\beta_2)$. In this embodiment, the angles are defined as: $\beta_1=\beta_2=1.5°$.

The grating pitch D is preferably set to be 0.5 times to twice a wavelength λ of the incident light 5. When the grating pitch D can not be set within this range, desired diffraction efficiency and polarization characteristics can not be obtained even if other parameters, for example depth, are adjusted. In this embodiment, the wavelength λ of the incident light 5 and the refractive index of the transparent substrate 2 are 0.78 μm and 1.5 respectively, and the grating pitch D of the first and second diffraction gratings 3 and 4 is set at 0.46 μm and the groove depth thereof is at about 1.2 μm. Accordingly, a P-polarization contained in the incident light 5, i.e. polarization whose electric field oscillates in the direction of the Y axis, can be transmitted at virtually 100%. Similarly, an S-polarization contained in the incident light 5, i.e. polarization whose electric field oscillates in the direction of the Z axis, can be diffracted at virtually 100%.

In polarization detector comprising a polarization diffraction element 1 of this structure, an incident angle $\theta$ of the incident light 5 to the polarization diffraction element 1 is preferably set at the n order Bragg angle expressed by the equation:

$$\theta=\sin^{-1}(n\cdot\lambda/2D)(n:\text{integer}) \quad (1)$$

Figure 2:
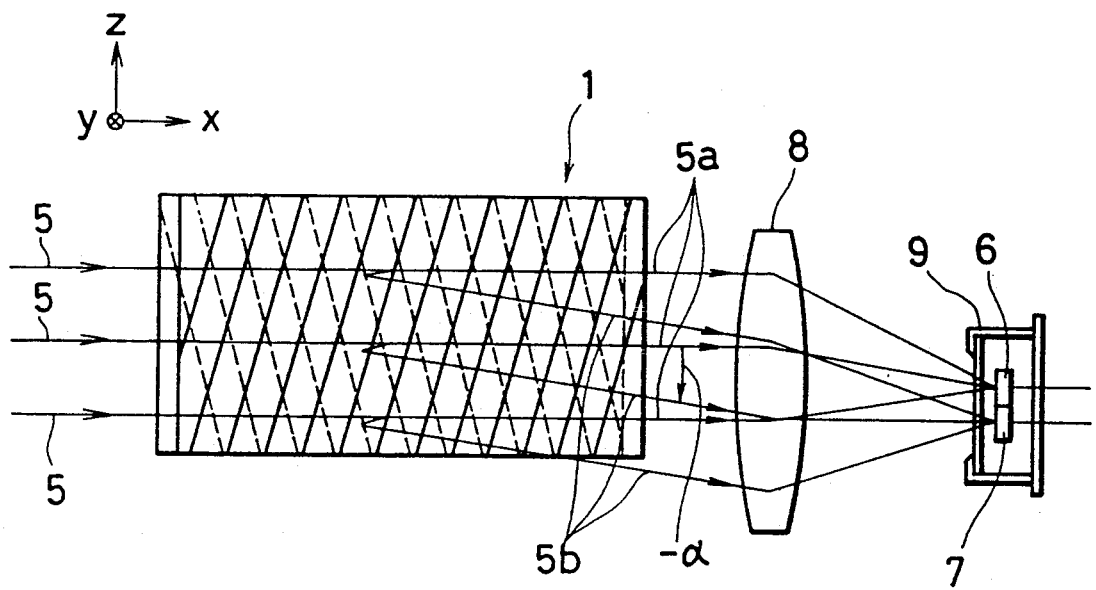

When the incident light falls upon the polarization diffraction element 1 at such an angle $\theta$, the diffraction efficiency is further improved to come near the diffraction efficiency of 100%. The P-polarization of the incident light 5 is transmitted through the diffraction gratings 3 and 4 of the polarization diffraction element 1 and then emerges as a zeroth-order diffracted light beam 5a. As shown in FIG. 2, the zeroth-order diffracted light beam 5a emerges in the direction of the X axis. Since the grating lines of the diffraction grating 3 is not parallel with the grating lines of the diffraction grating 4, a first-order diffracted light beam 5b diffracted by the diffraction gratings 3 and 4 emerge in the Z - X plane at an angle of $-\alpha$ to the X axis. In case $\beta_1$ and $\beta_2$ are sufficiently small, the angle of $\alpha$ is defined in accordance with the wavelength λ, the grating pitch D, and $\beta_1$ and $\beta_2$ of the incident light 5, i.e.

$$\alpha=(\lambda/D)\times(\beta_1+\beta_2) \quad (2)$$

$\alpha$ is 5° when λ equals 0.78 μm, D is 0.46 μm, $\beta_1$ and $\beta_2$ respectively equal 1.5° as aforesaid.

Accordingly, even when the zeroth-order diffracted light beam 5a and the first-order diffracted light beam 5b overlap in emerging, the zeroth-order diffracted light beam 5a and the first-order diffracted light beam 5b are respectively converged on different points in the focal plane by a converging lens 8 because they are separated by the polarization diffraction element 1 at the angle of $\alpha$, and therefore they can be easily split. In this embodiment when $\alpha$ equals 5° and a focal length f of the converging lens 8 is 10 mm, the zeroth-order diffracted light beam 5a and the first-order diffracted light beam 5b are respectively converged 0.9 mm apart from each other. Accordingly, the effective diameter of the converging lens 8 simply needs to be slightly larger than the effective diameter of the incident light 5. Besides, the converging points of the zeroth-order diffracted light beam 5a and first-order diffracted light beam 5b can hardly shift even if the wavelength λ of the incident light 5 changes, because the angles $\beta_1$, $\beta_2$ between the grating lines of the diffraction gratings 3, 4 and the Z' axis are sufficiently small and the diffraction gratings 3 and 4 have the same grating pitch D. Moreover, the effect of improving the degree of polarization raised due to the use of the two diffraction gratings 3 and 4 can also be maintained.

Figure 4:
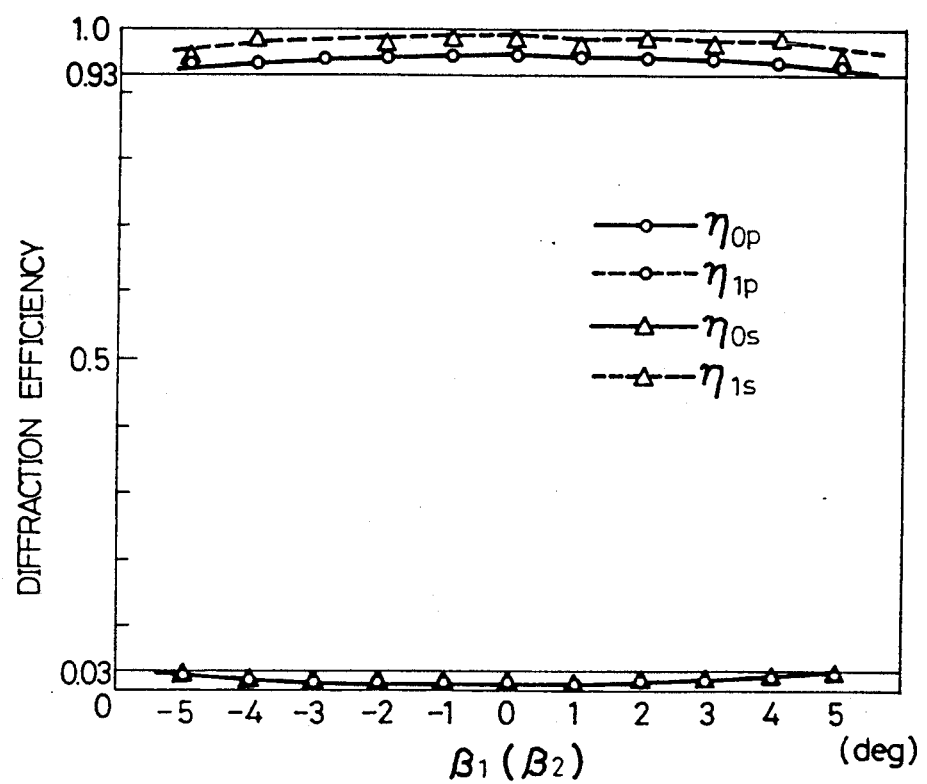
Figure 11:
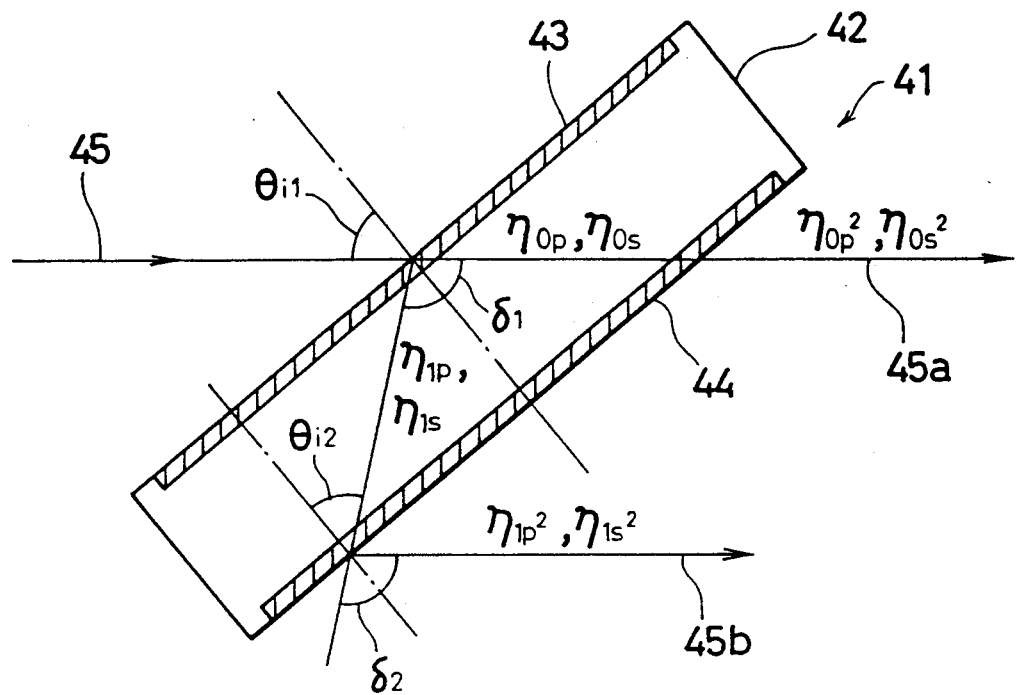
FIG. 11 to FIG. 13 show a modified example of the conventional polarization detector.

As shown by equation (2) described above, the larger $\beta_1$ and $\beta_2$ are, the larger $\alpha$ becomes, and the polarization characteristics are deteriorated in proportion to this. FIG. 4 shows the dependency of the diffraction efficiency $\eta_{0P}$, $\eta_{0S}$, $\eta_{1P}$, $\eta_{1S}$ of the diffraction grating 3 (or 4) on the angle $\beta_1$ (or $\beta_2$). The diffraction efficiency $\eta_{0P}$, $\eta_{0S}$, $\eta_{1P}$, $\eta_{1S}$ equal to the one shown in FIG. 11.

In FIG. 4, $$|\beta_1|\leq 5°(|\beta_2|\leq 5°)$$

i.e., if the angle $(\beta_1+\beta_2)$ between the grating lines of the diffraction grating 3 and the grating lines of the diffraction grating 4 is expressed as follows $$|\beta_1+\beta_2|\leq 10°,$$

the next equations are effected:

$$\eta_{0P}, \eta_{1S}\geq 0.93$$

$$\eta_{0S}, \eta_{1P}\leq 0.03$$

Therefore, the degree of polarization of the light transmitted through the diffraction gratings 3 and 4 can given by the equations:

$$(\eta_{0S}/\eta_{0P})^2\leq 0.0001$$

$$(\eta_{1P}/\eta_{1S})^2\leq 0.001$$

Consequently, they can be utilized.

Referring to FIG. 5 to FIG. 9, the following will describe another embodiment of the present invention.

Figure 8:
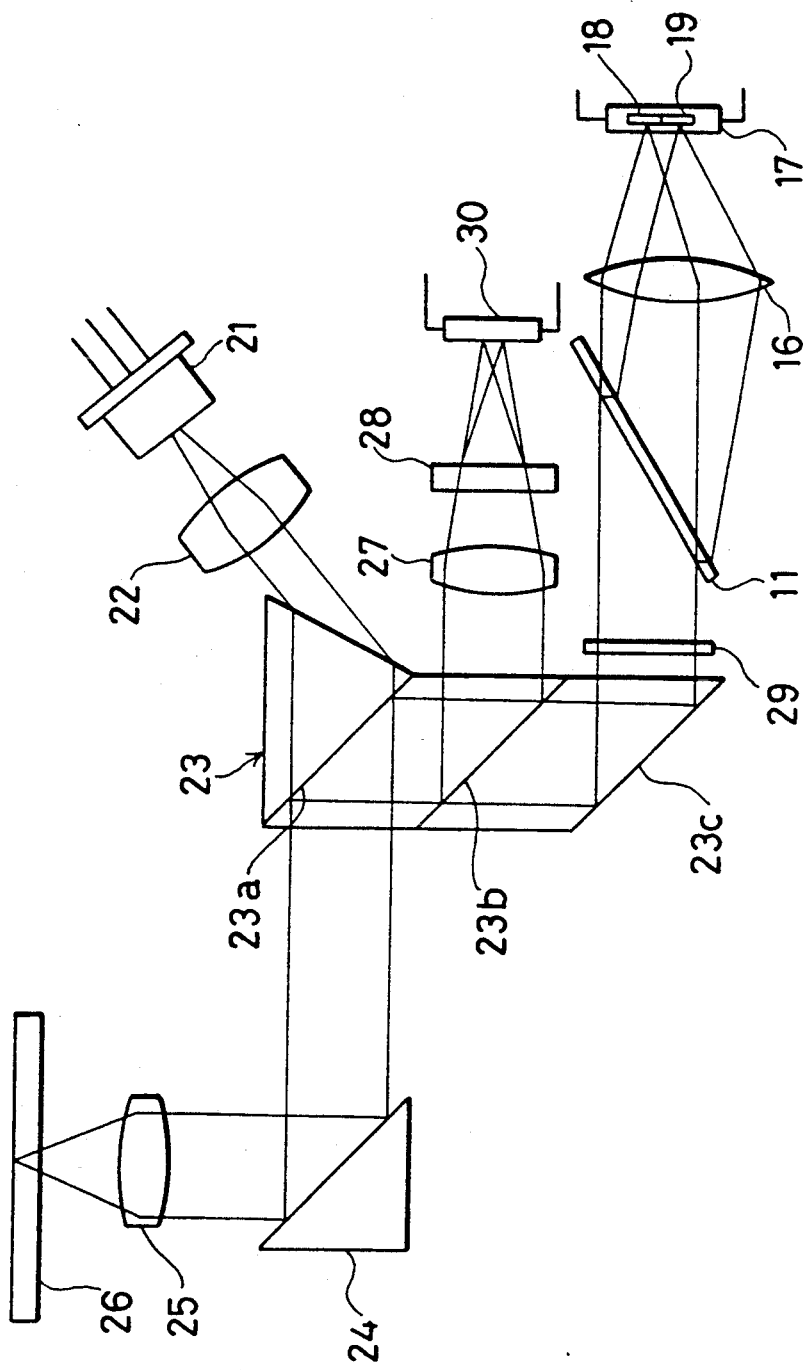

A polarization detector of this embodiment is integrated into, for example, an optical pickup shown in FIG. 8. First, the optical pickup will be explained.

In FIG. 8, laser light emitted from a semiconductor laser 21 has a nearly elliptical-shaped intensity distribution. The laser light goes through a collimating lens 22, and falls upon a compound prism 23 where it is converted to have a nearly circular-shaped intensity distribution. The light is then reflected by a mirror 24 and converged on a recording medium 26 by an objective lens 25.

The reflected light from the recording medium 26 again goes through the objective lens 25 and the mirror 24, and reaches the compound prism 23. The light is reflected at a right angle by a face 23a and falls upon a face 23b. A part of the reflected light from the recording medium 26 is reflected at a right angle from the face 23b, and converged on a photodetector 30 through a converging lens 27 and a cylindrical lens 28. Tracking and focus controlling signals are obtained by the photodetector 30.

In the mean time, the light transmitted through the face 23b is reflected at a right angle by a face 23c, then falls upon the polarization detector through a half-wave plate 29.

Figure 5:
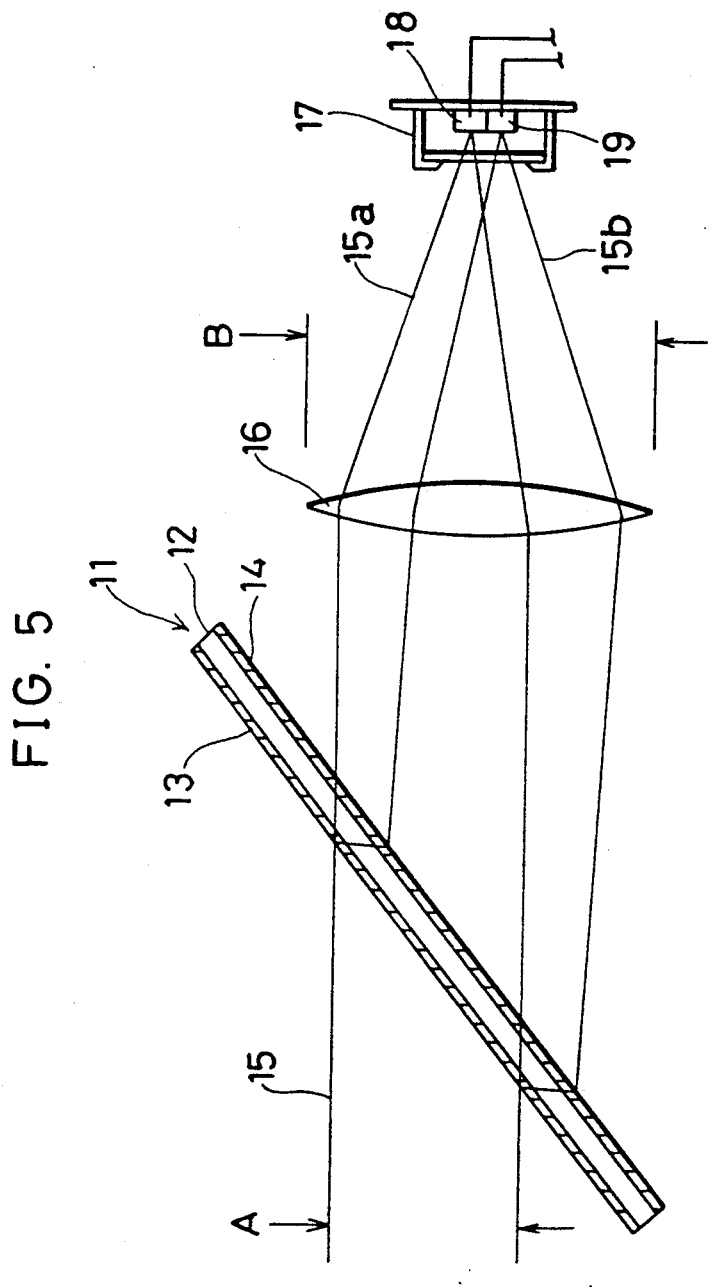
FIG. 5 to FIG. 9 show another embodiment of the present invention.

As shown in FIG. 5, the polarization detector comprises a polarization diffraction element 11, a converging lens 16, and a pair of photodetectors 18, 19 installed in a package 17.

Figure 6:
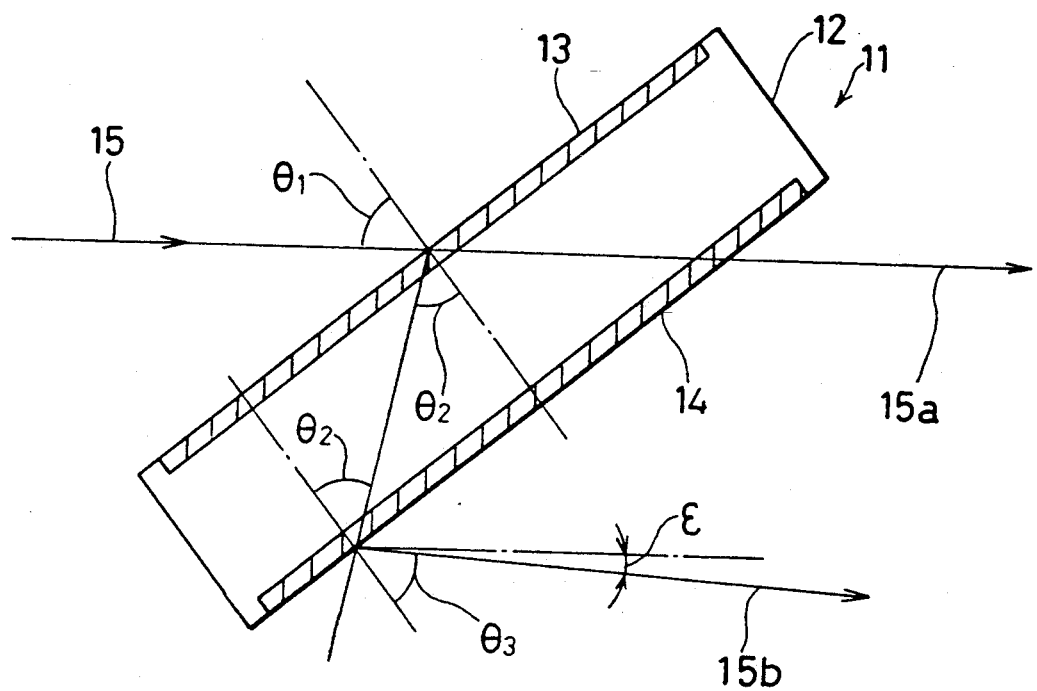

As shown in FIG. 6, the polarization diffraction element 11 comprises a flat-shaped transparent substrate 12 made of glass or other material. First and second diffraction gratings 13, 14 (shown by hatching for convenience' sake) are respectively formed on both faces of the substrate 12. Both of a grating pitch $D_1$ of the first diffraction grating 13 and a grating pitch $D_2$ of the second diffraction grating 14 are arranged to be substantially equal to the wavelength of an incident light 15. Besides, both their grating lines are set to a direction perpendicular to the drawing surface. The first and second diffraction gratings 13, 14 are of the relief type which are for example etched into the substrate 12. Both of the diffraction gratings 13, 14 have, for example, a sinusoidal waveform profile like the one shown in FIG. 12.

The diffraction gratings 13, 14 are fabricated such that a P-polarization contained in the incident light 15, whose electric field oscillates in a direction parallel with the drawing surface of FIG. 5, is transmitted at virtually 100%. An S-polarization contained in the incident light 15, whose electric field oscillates in a direction orthogonal to the drawing surface of FIG. 5, is diffracted at virtually 100%.

The relationship between the grating pitches $D_1$, $D_2$ of the first and second diffraction gratings 13, 14 and the wavelength $\lambda$ of the incident light 15 can be expressed as:

$$0 < |\lambda(1/D_1 - 1/D_2)(1 - (\lambda/2D_1)^2)^{-(\frac{1}{2})}| \leq 0.35; \text{ or}$$

$$0 < |\lambda(1/D_1 - 1/D_2)(1 - (\lambda/D_1 - \lambda/xD_2)^2)^{-(\frac{1}{2})}| \leq 0.35$$

Therefore, when the wavelength $\lambda$ of the incident light 15 of FIG. 5 equals 0.8 $\mu$m and the refractive index of the substrate 12 equals 1.5, the grating pitches $D_1$ and $D_2$ of the first and second diffraction gratings 13, 14 are preferably set to about 0.470 $\mu$m and 0.480 $\mu$m respectively. Their groove depth t is set, for example, to about 1.2 $\mu$m.

With the above arrangement, when the incident light 15 falls upon the diffraction grating 13 of the polarization diffraction element 11 at an incident angle $\theta_1$, its P-polarization is transmitted through the first and second diffraction gratings 13, 14 to produce a zeroth-order diffracted light beam 15a and emerges from the polarization diffraction element 11.

In the mean time, its S-polarization is diffracted by the first diffraction grating 13 in a direction crossing with the normal direction of the substrate 12 at an angle $\theta_2$ to produce a first-order diffracted light beam 15b, further diffracted by the second diffraction grating 14 to a direction crossing with the normal direction at an angle $\theta_3$, and emerges from the polarization diffraction element 11.

In this case, the angles $\theta_2$ and $\theta_3$ are given by the following equations:

$$\sin\theta_1 + \sin\theta_2 = \lambda/D_1 \quad (3)$$

$$\sin\theta_2 + \sin\theta_3 = \lambda/D_2 \quad (4)$$

With respect to both the first and second diffraction gratings 13, 14, the incident angle $\theta_1$ is preferably set to satisfy the Bragg conditions. However, when $D_1 \neq D_2$, there is no such $\theta$ that it satisfies the conditions. Therefore, the difference between the incident angle and the Bragg angle in the diffraction grating 13 and the difference between the incident angle and the Bragg angle in the diffraction grating 14, are preferably set to be substantially equal, i.e. the relationship should be expressed as follows:

$$\sin^{-1}(\lambda/2D_1) \leq \theta_1 \leq \sin^{-1}(\lambda/D_1 - \lambda/2D_2); \text{ or}$$

$$\sin^{-1}(\lambda/D_1 - \lambda/2D_2) \leq \theta_1 \leq \sin^{-1}(\lambda/2D_1) \quad (5)$$

Using FIG. 6 and some specific numerals, the relationship between the angles will be explained below.

Suppose $D_1$, $D_2$, and $\lambda$ are 0.470 $\mu$m, 0.480 $\mu$m, 0.8 $\mu$m respectively, the Bragg angles $\theta_{B1}$ and $\theta_{B2}$ of the first and second diffraction gratings 13, 14 are given by the equations:

$$\theta_{B1} = \sin^{-1}(\lambda/2D_1) = \sin^{-1}(0.8/(2 \times 0.47)) = 58.33°$$

$$\theta_{B2} = \sin^{-1}(\lambda/2D_2) = \sin^{-1}(0.8/(2 \times 0.48)) = 56.44°$$

According to equation (5), $58.33° < \theta_1 < 60.32°$. Taking the central value, 59.33°, as $\theta_1$ and substituting this into equations (3) and (4), gives 57.35° and 55.55° for $\theta_2$ and $\theta_3$ respectively. Consequently, an angle $\epsilon$ between the respective axes of the zeroth-order diffracted light beam 15a and the first-order diffracted light beam 15b is expressed as $\epsilon = \theta_1 - \theta_3 = 3.8°$.

Thus, even when the zeroth-order diffracted light beam 15a and the first-order diffracted light beam 15b overlap and fall upon the converging lens 16, they form different converging points on the focal surface, because they do not travel in parallel. Accordingly, they can easily be separated. For example, suppose that $\epsilon$ equals 3.8° and the focal length f of the converging lens 16 is 10 mm, the zeroth-order diffracted light beam 15a and the first-order diffracted light beam 15b fall on points 500 $\mu$m apart from each other.

The zeroth-order diffracted light beam 15a and the first-order diffracted light beam 15b can overlap and fall upon the converging lens 16, and therefore the effective diameter B of the converging lens 16 can be slightly larger than the effective diameter A of the incident light 15.

Further, as the zeroth-order diffracted light beam 15a and the first-order diffracted light beam 15b may overlap and fall upon the converging lens 16, the substrate 12 can be thinner compared with a conventional one.

In the mean time, since the difference between the grating pitches $D_1$ and $D_2$ of the first and second diffraction gratings 13, 14 is very small, the effect of improving the degree of polarization and of stabilizing the converging points which shift due to changes in wavelength of the incident light 15 can be maintained at a similar level to the device shown in FIG. 11 to FIG. 13, and FIG. 14 by the installation of the first and second diffraction gratings 13, 14.

The following will explain conditions to be satisfied by the grating pitches $D_1$ and $D_2$. The larger the difference between $D_1$ and $D_2$, the greater $\epsilon$ becomes. However, if $\epsilon$ becomes larger, the incident angle deviates from the Bragg conditions, which causes the polarization characteristics to be deteriorated. Thus, the difference between $D_1$ and $D_2$ needs to be kept within a specified range.

Figure 7:
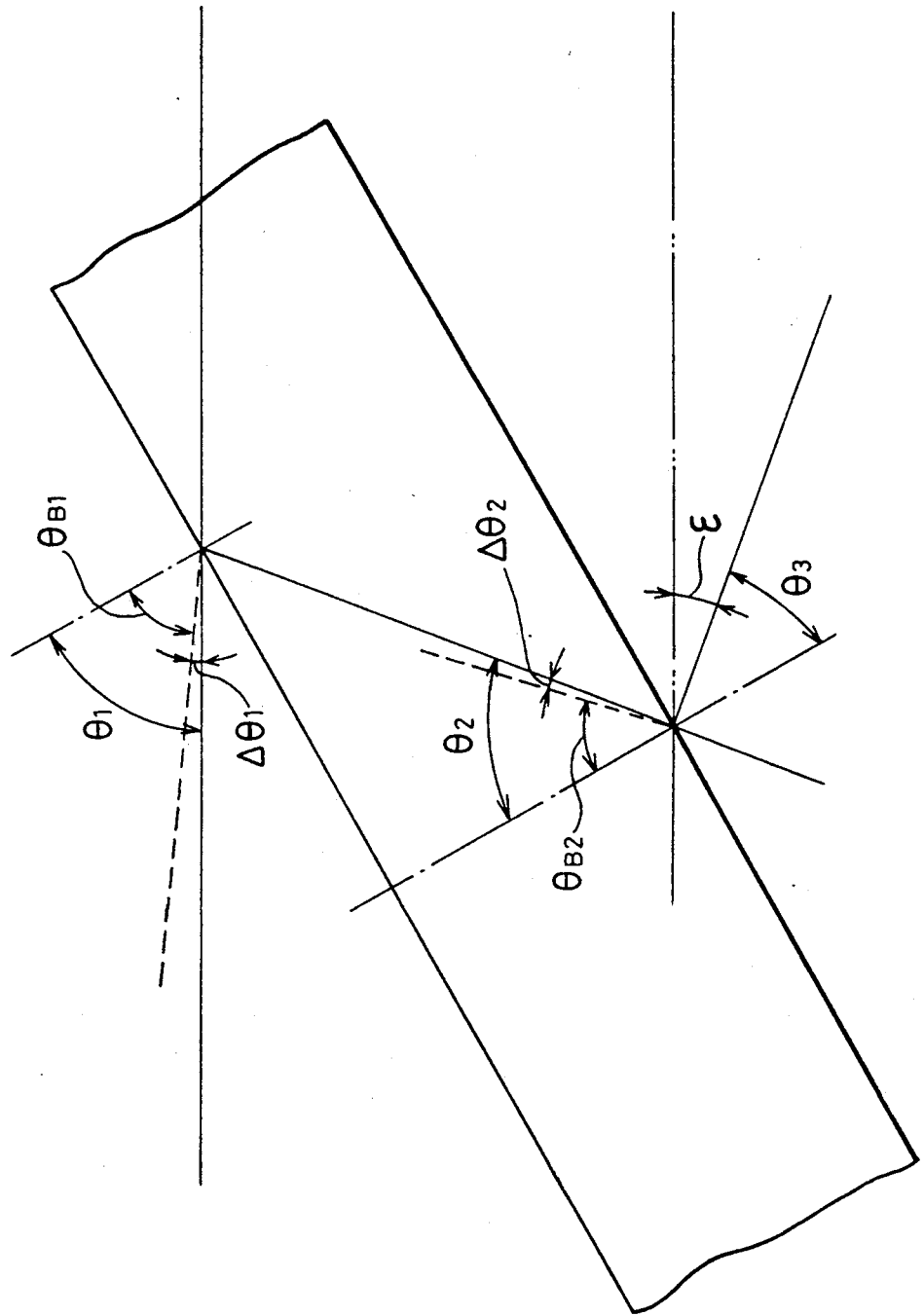

$\Delta\theta_1$ and $\Delta\theta_2$ in FIG. 7 respectively show the difference between the Bragg angles $\theta_{B1}$, $\theta_{B2}$ of the first and second diffraction gratings 13, 14 and the incident angles $\theta_1$, $\theta_2$. When the incident angles $\theta_1$ and $\theta_2$ are close to the Bragg angles $\theta_{B1}$ and $\theta_{B2}$, the following equations are effected:

$$\theta_1 + \theta_2 \simeq 2\theta_{B1} \quad (6)$$
$$\therefore \theta_2 \simeq 2\theta_{B1} - \theta_1 \simeq 2(\theta_1 - \Delta\theta_1) - \theta_1 = \theta_1 - 2\Delta\theta_1;$$

and $$\theta_2 + \theta_3 \simeq 2\theta_{B2} \quad (7)$$
$$\therefore \theta_3 \simeq 2\theta_{B2} - \theta_2 = \theta_2 - 2\Delta\theta_2$$

Substituting equation (6) into equation (7), yields the following:

$$\theta_3 \simeq \theta_1 - 2(\Delta\theta_1 + \Delta\theta_2)$$

Therefore, the following will be expressed:

$$\epsilon = \theta_1 - \theta_3 \simeq 2(\Delta\theta_1 + \Delta\theta_2) \quad (8)$$

Figure 9:
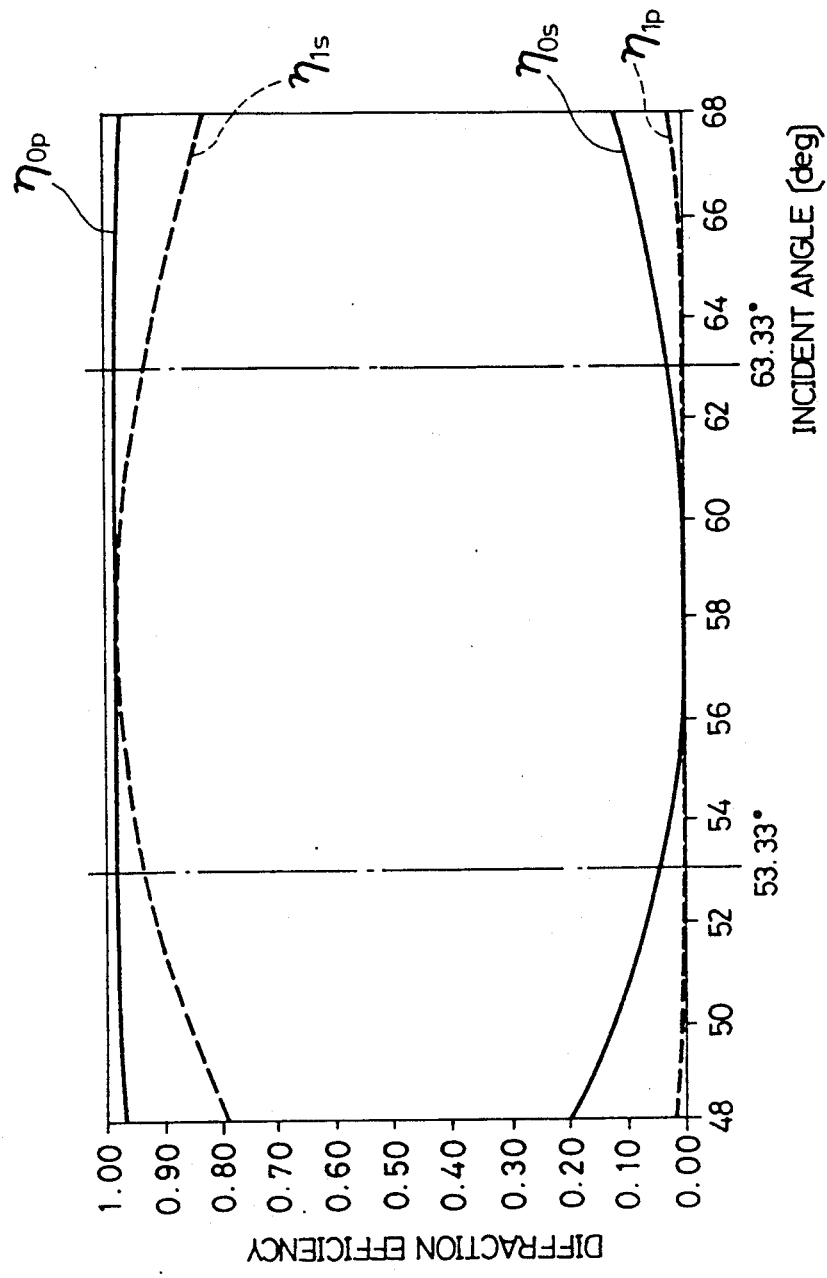
Figure 10:
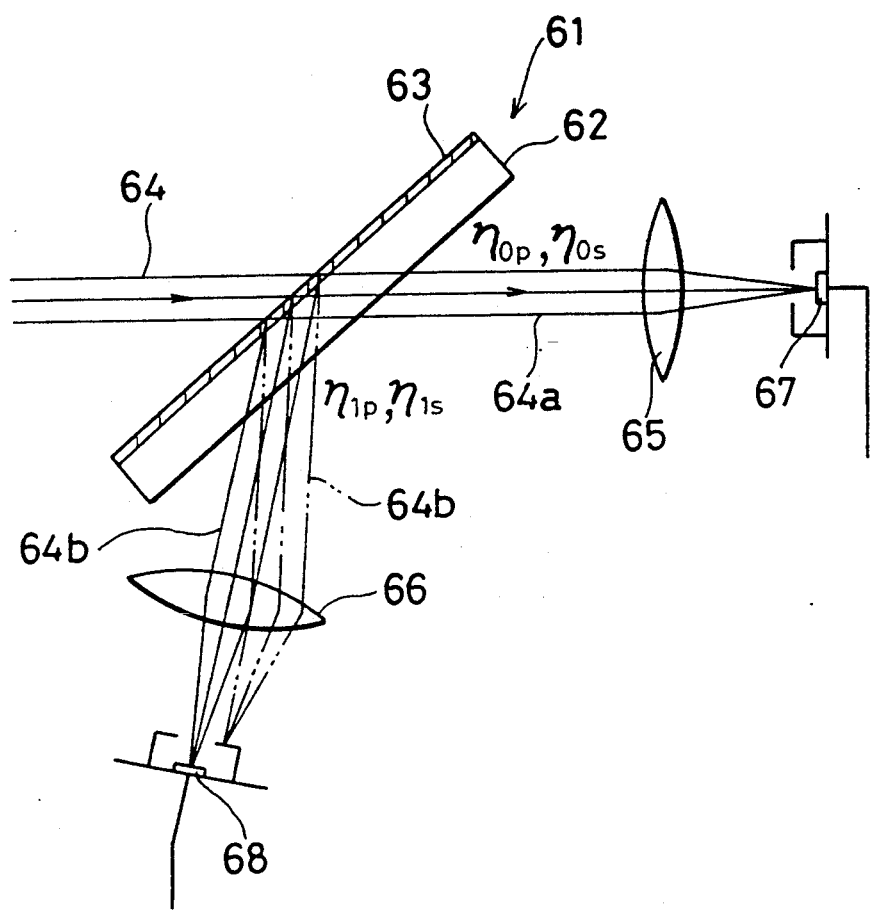
FIG. 10 is a view schematically illustrating the structure of a conventional polarization detector.

The dependency of the diffraction efficiency of a diffraction grating, whose grating pitch $D_1$ equals 0.47 $\mu$m and whose groove depth $t$ equals 1.17 $\mu$m, on an incident angle is as shown in FIG. 9. Similar to the above-mentioned embodiment, $\eta_{0P}$ represents the zeroth-order diffraction efficiency of the P-polarization and $\eta_{1P}$ the first-order diffraction efficiency of the P-polarization, and $\eta_{0S}$ represents the zeroth-order diffraction efficiency of the S-polarization and $\eta_{1S}$ the first-order diffraction efficiency of the S-polarization. It is obvious from the figure that in case where the incident angle is in a specified range (i.e. within a of 5° either side of the Bragg angle, wherein the Bragg angle is 58.3°), $\eta_{0P}, \eta_{1S} \geq 0.90$, while $\eta_{0S}, \eta_{1P} \leq 0.05$. The degrees of polarization of the zeroth-order diffracted light beam and the first-order diffracted light beam passed through the first and second diffraction gratings 13, 14 are respectively expressed as $(\eta_{0S}/\eta_{0P})^2$, $(\eta_{1P}/\eta_{1S})^2 \leq 0.003$, whereby they can be utilized.

Consequently, $\Delta\theta_1, \Delta\theta_2 \leq 5°$ needs to be achieved. Substituting this into equation (8), yields the following:

$$\epsilon \leq 20° = 0.35\text{rad} \quad (80')$$

According to equations (3) and (4), the following will be expressed:

$$\sin\theta_1 - \sin\theta_3 = \lambda(1/D_1 - 1/D_2)$$

$$\therefore \sin\theta_1 - \sin(\theta_1 - \epsilon) = \lambda(1/D_1 - 1/D_2)$$

Then, $$\sin\theta_1 - \sin\theta_1 \cos\epsilon + \sin\epsilon\cos\theta_1 = \lambda(1/D_1 - 1/D_2) \quad (9)$$

where $\epsilon$ is sufficiently small, and $\cos\epsilon \simeq 1$ and $\sin\epsilon \simeq \epsilon$ can thus be very close. Substituting this into equation (9), yields the following:

$$\epsilon \simeq \lambda(1/D_1 - 1/D_2)/\cos\theta_1 \quad (10)$$

According to the equation $\sin^2\theta_1 + \cos^2\theta_1 = 1$ and equation (5), the following will be expressed:

$$\cos\theta_1 \leq (1 - (\lambda/2D_1)^2)^{(\frac{1}{2})}; \text{ or}$$

$$\cos\theta_1 \leq (1 - (\lambda/D_1 - \lambda/2D_2)^2)^{(\frac{1}{2})} \quad (11)$$

According to equations (10) and (11), the following will be given:

$$\lambda(1/D_1 - 1/D_2)(1 - (\lambda/2D_1)^2)^{-(\frac{1}{2})} \leq \epsilon, \text{ or}$$

$$\lambda(1/D_1 - 1/D_2)(1 - (\lambda/D_1 - \lambda/2D_2)^2)^{-(\frac{1}{2})} \leq \epsilon \quad (12)$$

According to equation (8'), since $\epsilon < 0.35$rad, $D_1$ and $D_2$ are set to satisfy the following condition:

$$0 < |\lambda(1/D_1 - 1/D_2)(1 - (\lambda/2D_1)^2)^{-(\frac{1}{2})}| \leq 0.35; \text{ or}$$

$$0 < |\lambda(1/D_1 - 1D_2)(1 - (\lambda/D_1 - \lambda/2D_2)^2)^{-(\frac{1}{2})}| \leq 0.35$$

In this embodiment, the first and second diffraction gratings 13, 14 are formed on both faces of the substrate 12 by etching, but they may be formed by, for example, photoresist.

Figure 12:
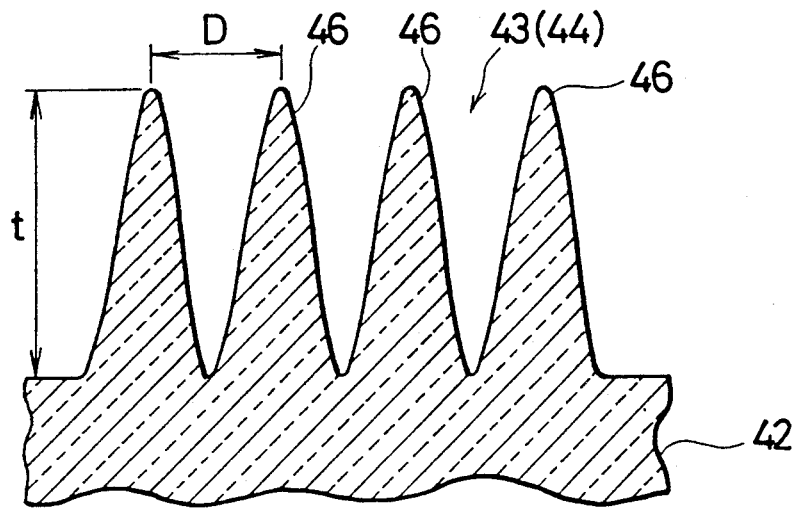
Figure 13:
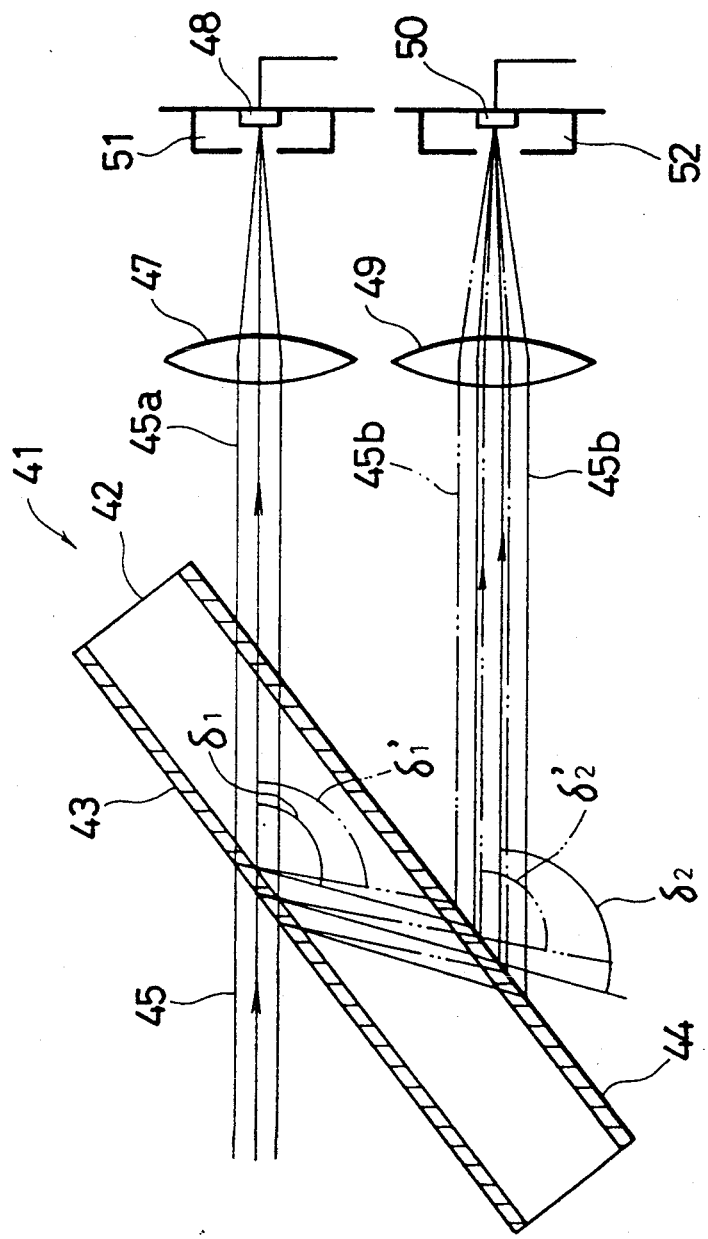
Figure 14:
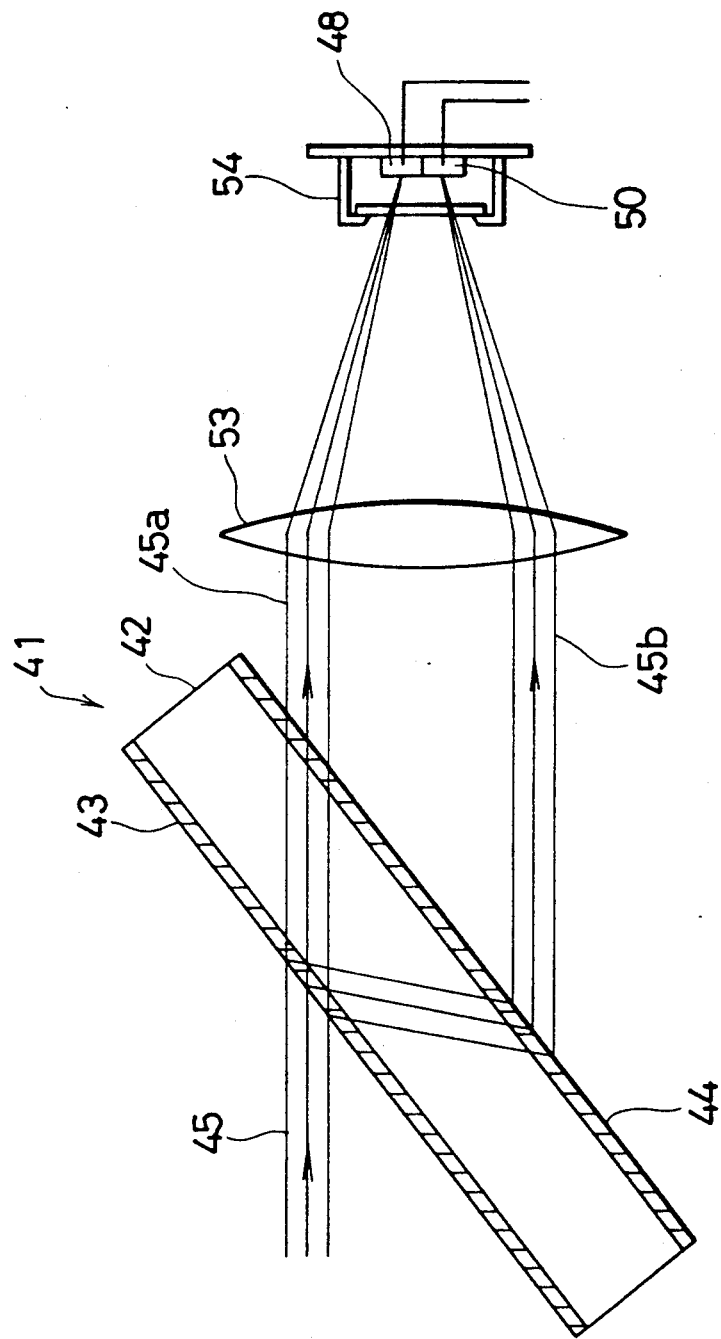
FIG. 14 is another modified example of the conventional polarization detector.

In the above-mentioned two embodiments, the profiles of the first and second diffraction gratings 3, 4 and the first and second diffraction gratings 13, 14 are not limited to the shape of sinusoidal waveform shown in FIG. 12, and they may have for example a rectangular, triangle or trapezoid profile.

Integration of the above-mentioned type polarization detector into optical pickup achieves the manufacturing of a still more compact and lightweight optical pickup.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A polarization diffraction element comprising:
   a flat-shaped transparent substrate having a plurality of faces;
   a first diffraction grating formed on one of the plurality of faces of the substrate; and
   a second diffraction grating formed on one of the plurality of faces different from that of the first diffraction grating;
   the first diffraction grating and the second diffraction grating being formed such that a grating pitch of the first diffraction grating and a grating pitch of the second diffraction grating are equal, and such that a direction of grating lines of the first diffraction grating and a direction of grating lines of the second diffraction grating form a predetermined slight angle such that none of said diffraction gratings operate as a phase compensation grating.

2. The polarization diffraction element as defined in claim 1, wherein said predetermined angle is less than 10°.

3. The polarization diffraction element as defined in claim 1, wherein the grating pitches of the first and second diffraction gratings range from 0.5 to 2 times the wavelength of a light incident to the polarization diffraction element.

4. A polarization detector comprising:
a flat-shaped transparent substrate having a plurality of faces;
a first diffraction grating formed on one of the plurality of faces of the substrate;
a second diffraction grating formed on one of the plurality of faces different form that of the first diffraction grating;
a converging lens whereupon a light beam transmitted through the first and second diffraction gratings and a light beam diffracted by the first and second diffraction gratings are incident; and
a pair of photodetectors for receiving the transmitted and diffracted light beams respectively,
the first diffraction grating and the second diffraction grating being formed such that a grating pitch of the first diffraction grating and a grating pitch of the second diffraction grating are equal, and such that a direction of grating lines of the first diffraction grating and a direction of grating lines of the second diffraction grating are skewed and form a predetermined slight angle away from parallel such that none of said diffraction gratings operate as a phase compensation grating.

5. A polarization diffraction element comprising:
a flat-shaped substrate having a plurality of faces;
a first diffraction grating, formed on one of the plurality of faces of the substrate and having a first constant grating pitch $D_1$; and
a second diffraction grating, formed on one of the plurality of faces different from that of the first diffraction grating and having a second constant grating pitch $D_2$, and
the first diffraction grating and the second diffraction grating being formed such that grating lines of the first diffraction grating and grating lines of the second diffraction grating are parallel with each other and the first constant grating pitch $D_1$ is different form that of the second constant grating pitch $D_2$, and further the first constant grating pitch $D_1$ and the second constant grating pitch $D_2$ satisfy the condition, $$0 < |\lambda(1/D_1 - 1/D_2)(1 - (\lambda/2D_1)^2)^{-(\frac{1}{2})}| \leq 0.35;\ \text{or}$$

$$0 < |\lambda(1/D_1 - 1/D_2)(1 - (\lambda/D_1 - \lambda/2D_2^{(2)})^{-(\frac{1}{2})}| \leq 0.35$$

and where $\lambda$ is the wavelength of incident light to the first diffraction grating.

6. A polarization detector comprising:
a flat-shaped substrate having a plurality of faces;
a first diffraction grating, formed on one of the plurality of faces of the substrate, having a first constant grating pitch $D_1$;
a second diffraction grating, formed on one of the plurality of faces different from that of the first diffraction grating, having a second constant grating pitch $D_2$;
a converging lens whereupon a light beam transmitted through the first and second diffraction gratings and a light beam diffracted by the first and second diffraction gratings are incident; and
a pair of photodetectors for receiving the transmitted and diffracted light beams respectively,
the first diffraction grating and the second diffraction grating being formed such that grating lines of the first diffraction grating and grating lines of the second diffraction grating are parallel with each other and the first constant grating pitch $D_1$ is different from that of the second constant grating pitch $D_2$, and further the first constant grating pitch $D_1$ and the second constant grating pitch $D_2$ satisfy the condition, $$0 < |\lambda(1/D_1 - 1/D_2)(1 - (\lambda/2D_1)^2)^{-(\frac{1}{2})}| \leq 0.35;\ \text{or}$$

$$0 < |\lambda(1/D_1 - 1/D_2)(1 - (\lambda/D_1 - \lambda/2D_2)^2)^{-(\frac{1}{2})}| \leq 0.35$$

and where $\lambda$ is the wavelength of incident light to the first diffraction grating.

7. The polarization detector as defined in claim 6, wherein the first diffraction grating is set such that the incident light falls upon the first diffraction grating at an incident angle $\theta$, the incident angle $\theta$ satisfying the condition, $$\sin^{-1}(\lambda/2D_1) \leq \theta \leq \sin^{-1}(\lambda/D_1 - \lambda/2D_2);\ \text{or}$$

$$\sin^{-1}(\lambda/D_1 - \lambda/2D_2) \leq \theta \leq \sin^{-1}(\lambda/2D_1).$$

* * * * *